United States Patent

[11] 3,596,451

| [72] | Inventor | Frank M. Spear |
| | | 625 Todd Ave., Ellwood City, Pa. 16117 |
| [21] | Appl. No. | 844,255 |
| [22] | Filed | July 24, 1969 |
| [45] | Patented | Aug. 3, 1971 |

[54] LAWN MOWER CUTTER BAR
6 Claims, 3 Drawing Figs.

| [52] | U.S. Cl. | 56/255 |
| [51] | Int. Cl. | A01d 55/18 |
| [50] | Field of Search | 56/255, 24.5 |

[56] References Cited
UNITED STATES PATENTS

| 3,091,905 | 6/1963 | Aikens, Jr. | 56/255 |
| 3,481,124 | 12/1969 | Machovina | 56/255 |

*Primary Examiner*—Robert Peshock
*Attorneys*—Clarence A. O'Brien and Harvey B. Jacobson ABSTRACT: In a rotary lawn mower having a housing with a depending side skirt and a centrally mounted rotary cutting blade, a combination cutter bar and blade guard comprising a flat annular member positioned in underlying concentric relation to the rotary blade and mounted on the opposed sides of the housing by angle brackets. The annular member, along the forward and rearward directed portions thereof, has a series of spaced parallel slots defined therein, forming grass receiving and guiding fingers, these slots extending inwardly from the outer periphery of the member and terminating short of the inner periphery of the member. The path of the outer cutting ends of the cutter blade overlies the fingers for engagement with and the cutting of grass guided thereby.

PATENTED AUG 3 1971
3,596,451
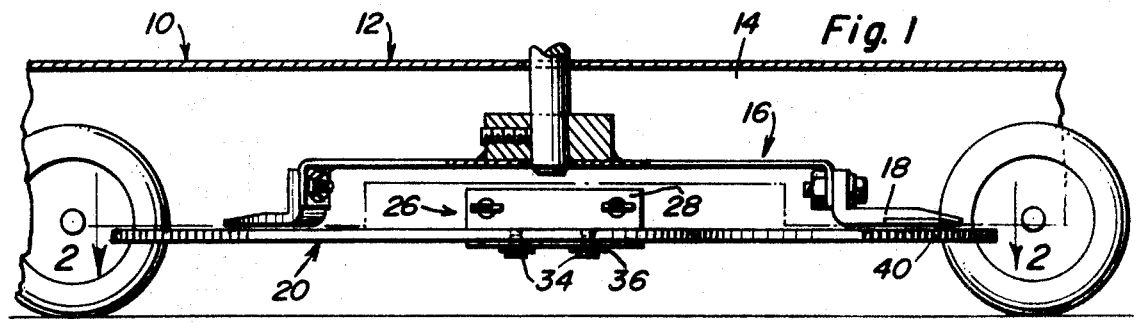
Fig. 1
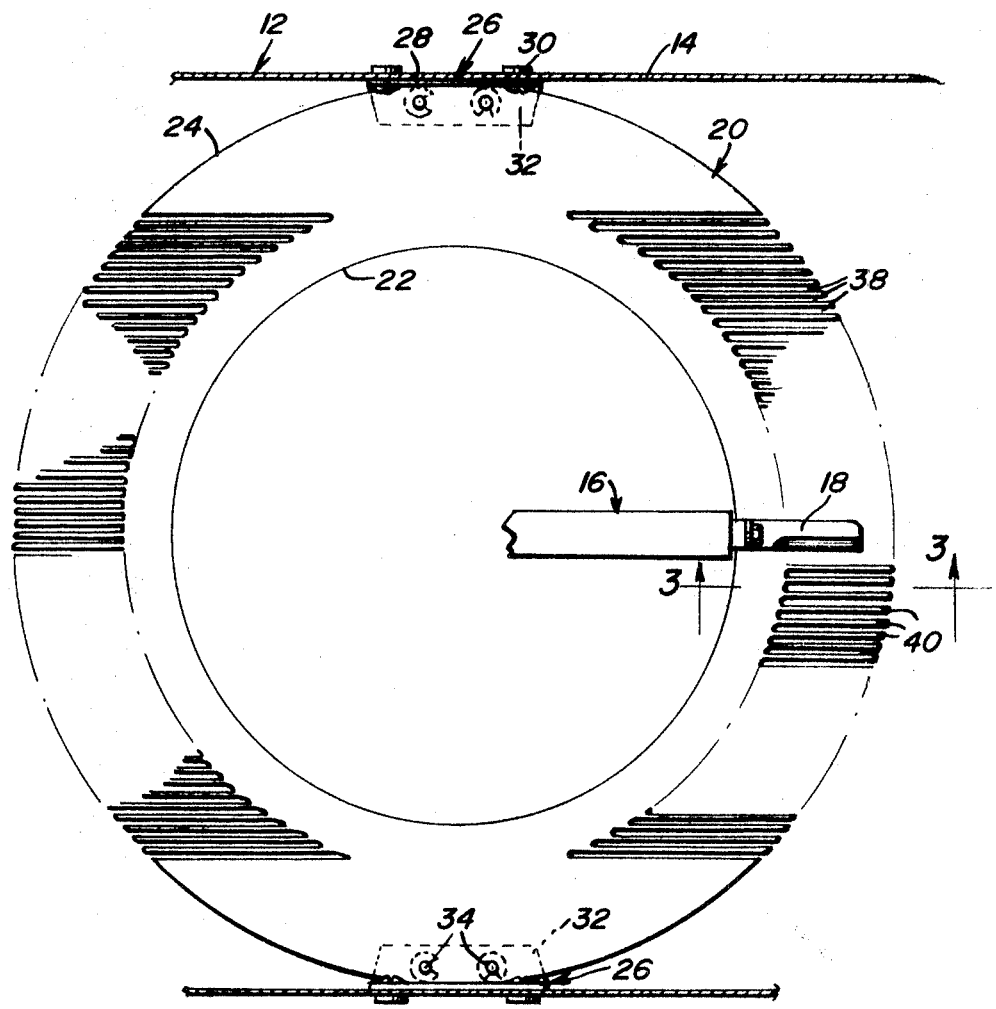
Fig. 2
Fig. 3
Frank M. Spear
INVENTOR
BY Clarence A. O'Brien
and Harvey B. Jacobson
Attorneys

LAWN MOWER CUTTER BAR

The instant invention is generally concerned with rotary lawn mowers, and more particularly relates to a unique combination cutter bar and blade guard mountable on substantially any conventional rotary mower for underlying cooperation with the rotary blade associated therewith.

It is a primary object of the instant invention to provide a ringlike or annular cutter bar mountable in underlying relation to a rotary blade and including grass lifting and guiding fingers for a uniform introduction of the grass to the rotating cutting blade for a mowing thereof. Likewise, inasmuch as the cutter bar of the instant invention underlies the blade, it constitutes a safety guard, affording protection both for the blade itself, against damage thereto by contact with foreign bodies, and also for the user of the lawn mower against accidental contact with the rotating blade.

Basically, the cutter bar, or combination cutter bar blade guard, of the instant invention, consists of a flat annular member having spaced concentric inner and outer edges. The member is mountable transversely across the housing of a rotary mower by means of opposed brackets. The forwardly and rearwardly directed portions of the member have a series of slots defined therein which form grass receiving and guiding fingers for the introduction thereof to the outer cutting ends of the rotating blade which pass over these fingers.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a cross-sectional view through a mower having the cutter bar of the instant invention mounted thereon, the cutter bar being seen in elevation;

FIG. 2 is a cross-sectional view taken substantially on a plane passing along line 2-2 in FIG. 1 and illustrating the cutter bar in plan; and FIG. 3 is an enlarged cross-sectional view taken substantially on a plane passing along line 3-3 in FIG. 2.

Referring now more specifically to the drawings, reference numeral 10 is used to designate a rotary lawn mower of the type including a blade overlying wheel-supported housing 12 having a peripheral blade-enclosing skirt 14. A rotary cutting blade 16 is mounted and rotatably operated centrally within the housing in a manner so as to engage and mow grass along the path of travel of the mower 10, whether moving forwardly or rearwardly. In the particular mower illustrated in the drawings, the cutter blade 16 has been provided with downwardly offset replaceable cutting ends or tips 18. However, it is contemplated that the combination cutter bar and blade guard of the instant invention, herein designated by reference numeral 20, be equally adaptable for use with substantially any type of conventional cutter blade.

The combination cutter bar and blade guard 20 consists of a rigid flat ringlike or annular member including inner and outer concentric circular edges 22 and 24. The member spans the mower housing 12 and is mounted concentrically with the cutter blade 16 immediately therebelow by means of a pair of opposed angle brackets 26. Each angle bracket 26 includes a vertical leg 28 fastened by appropriate fasteners 30 to the side portion of the depending housing skirt 14, and a horizontal leg 32 underlying the adjoining edge portion of the combination bar and guard member. Two fasteners, in the nature of flat-headed capscrews 34, are utilized to secure the member to each bracket horizontal leg 32, the screws 34 being introduced upwardly through apertures in the bracket legs 32 and into tapped holes defined through the member. Appropriate lockwashers 36 can also be utilized in conjunction with the screws 34. Utilizing the mounting brackets 26, it will be appreciated that the combination cutter bar and guard can be mounted on substantially any conventional rotary mower incorporating a housing with a depending skirt, at least along the opposed sides thereof. By the same token, the cutter bar and guard member can be selectively removed through simply an unfastening of the four mounting screws 34 should such be necessary for, as an example, a replacement of the cutter blade tips 18.

The combination cutter bar and guard member is provided, along both the forwardly and rearwardly directed portions thereof, relative to the direction of movement of the mower 10, with a series of spaced parallel slots 38 across the major portion of the width of the member so as to define a series of grass engaging, lifting and guiding fingers 40. The fingers 40, in view of the nature and spacing of the slots 38, are, while spaced from each other, relatively closely adjacent to each other and orientated parallel to each other along the direction of travel of the mower 10. Further, the slots and fingers 38 and 40 extend to a common arcuate line, concentric with the member, located outward of the inner member edge 22 and inward of the path of movement of the cutting ends or tips 18 of the cutter blade 16. In this manner, the mower-encountered grass will be guided to and into the path of the rotating blade for a positive mowing thereof, the member, due to its relatively close position adjacent the rotating blade 16, cooperating therewith in the manner of a cutter bar so as to provide a positive severing of the guided blades of grass, while at the same time acting as an effective guard for the rotary blade 16. In this connection, it will be noted that the cutting ends 18 of the cutter blade 16 are orientated so as to overlie the combination cutter bar and guard member inward of the peripheral outer edge 24 thereof, thereby not being exposed to foreign objects which might be introduced under the mower housing 12.

It is contemplated that the distal ends of the fingers or teeth 40 be either rounded or pointed. Further, noting FIG. 3, the member, at the inner end of each of the slots, is beveled or undercut at approximately a 30° angle so as to provide a relatively sharp edge 42 at the inner end of each tooth defining slot, this inner end being slightly rounded as indicated in FIG. 2 so as to facilitate a positive severing of the grass which might move inwardly thereagainst. Incidentally, inasmuch as all of the slots and fingers extend inwardly to a common arcuate line concentric with the member, it will be appreciated that the length of the slots and fingers progressively increase from the forward and rearmost points on the member outward to the opposite sides thereof. In this manner, a positive guiding movement of the grass completely into the path of the rotating blade ends is assured.

From the foregoing, it will be appreciated that a highly unique lawn mower attachment has been defined. This attachment is in the nature of a combination cutter bar and guard which mounts on the housing of a rotary mower in a position concentric with and immediately underlying the cutter blade. The bar includes both forwardly and rearwardly directed grass-guiding teeth defined therein which tend to comb, lift and position the grass for a smooth effective mowing thereof. The attachment itself is mounted on the mower by means of a pair of opposed angle brackets which may e permanently affixed to the mower housing, and which in turn releasably mount the combination cutter bar guard.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What I claim as new is as follows:

1. In a rotary mower having a housing and a rotary cutter blade mounted centrally therein, a combination cutter bar and blade guard comprising a flat one-piece annular member having concentric spaced inner and outer circular marginal edges, said member capable of being positioned and orientated transversely across the mower housing in a plane below and concentric with said cutter blade, said member being of a size whereby the rotary path of the respective outer ends of the cutter blade is defined between the inner and outer circular marginal edges of the member, a segmental portion of said member forwardly directed relative to the path of movement of the mower having a first set of spaced parallel slots therein and forming teeth therebetween for the guided reception of blades of grass to be cut, said slots, opening only through and extending inwardly from the outer marginal edge to a point short of the inner marginal edge and being closed at a point short of the inner marginal edge and inwardly beyond the rotary path of the outer ends of the cutter blade.

2. The mower of claim 1 and in combination a second set of spaced parallel slots defined in said member along the rearwardly directed segmental portion thereof in diametrically opposed relation to the first-mentioned slots, said second set of slots defining a second set of grass receiving and guiding teeth complemental to said first-named teeth.

3. The mower of claim 2 wherein the inner ends of both sets of slots are orientated on arcs concentric with said marginal edges.

4. The mower of claim 3 wherein the outer ends of said teeth are convexly rounded.

5. The mower of claim 4 wherein the inner ends of said slots are beveled between the upper and lower surfaces of said member.

6. The mower of claim 5 including a pair of angle brackets mounting said annular member on the mower housing, each angular bracket having one leg adapted to be affixed to the mower housing and the second leg thereof underlying the edge portion of said annular member, said angle brackets being located approximately diametrically opposed from each other, and fastener means extending through the annular member and each angle bracket.